US011992862B1

(12) United States Patent
Zhou

(10) Patent No.: US 11,992,862 B1
(45) Date of Patent: May 28, 2024

(54) CLEANING DEVICE AND CLEANER

(71) Applicant: DONGGUAN AISI HEALTH PRODUCTS CO., LTD., Dongguan (CN)

(72) Inventor: Biao Zhou, Gaoan (CN)

(73) Assignee: DONGGUAN AISI HEALTH PRODUCTS CO., LTD., Dongguan (CN)

( * ) Notice: Subject to any disclaimer, the term of this patent is extended or adjusted under 35 U.S.C. 154(b) by 0 days.

(21) Appl. No.: 18/528,927

(22) Filed: Dec. 5, 2023

(30) Foreign Application Priority Data

Nov. 14, 2023 (CN) ......................... 202323072986.7

(51) Int. Cl.
*B08B 3/02* (2006.01)
*A47K 3/28* (2006.01)
*A47K 7/04* (2006.01)

(52) U.S. Cl.
CPC .................. *B08B 3/02* (2013.01); *A47K 3/28* (2013.01); *A47K 7/04* (2013.01)

(58) Field of Classification Search
CPC ........... B08B 3/02; B08B 1/046; B08B 1/048; B08B 1/06; B08B 1/14; A47K 3/28; A47K 7/04; A61M 3/0254; A61M 3/0258
USPC ............................................. 4/615, 443–448
See application file for complete search history.

(56) References Cited

U.S. PATENT DOCUMENTS 3,653,377 A * 4/1972 Rebold ............... A61M 3/0258 604/153
5,097,540 A * 3/1992 Lovitt ................. A61M 3/0254 4/443

FOREIGN PATENT DOCUMENTS

GB 2597562 A * 2/2022 ............... A47K 3/28

* cited by examiner

*Primary Examiner* — Tuan N Nguyen
(74) *Attorney, Agent, or Firm* — Daniel M. Cohn; Howard M. Cohn

(57) ABSTRACT

A cleaning device and a cleaner are provided. The cleaner includes the cleaning device and at least one liquid storage device. The cleaning device includes an outer housing, at least one first connecting component, a liquid spraying structure, and a liquid driving structure. The outer housing includes a liquid inlet and a liquid outlet. First connecting components having different structures and liquid storage devices having different structures are provided, one of the first connecting components is matched with a corresponding one of the liquid storage devices, and the one of the first connecting components matched with the corresponding one of the liquid storage devices is connected to the outer housing. The outer housing is connected to the first connecting components having different structures to connect to the liquid storage devices having different structures.

20 Claims, 13 Drawing Sheets

A-A

CLEANING DEVICE AND CLEANER

TECHNICAL FIELD

The present disclosure relates to a technical field of cleaning apparatus, and in particular to a cleaning device and cleaner.

BACKGROUND

In daily life, human bodies may generate sweat and secretions, and bacteria and other microorganisms may easily breed, especially private parts, so that regularly cleaning the private parts of the human bodies is necessary. For being convenient to clean the private parts of the human bodies, currently, there are multiple kinds of vaginal douche cleaners available in the market, some of the vaginal douche cleaners are manual, which is trouble in operation methods, so that cleaning of the private parts of the human bodies is difficult to be continuous and thorough; some of the vaginal douche cleaners are electric and each includes a washing device and a liquid storage bottle, the washing device and the liquid storage bottle are integrally formed to form a larger size, which are inconvenient to carry when going outside or being on business trips.

SUMMARY

Embodiments of the present disclosure provide a cleaning device and a cleaner, which are convenient in transportation and carrying. Use convenience of the cleaning device and the cleaner is further improved.

In a first aspect, the embodiments of the present disclosure provide a cleaning device for cleaning private parts of human bodies, including an outer housing, at least one first connecting component, a liquid spraying structure, and a liquid driving structure. The outer housing includes a liquid inlet and a liquid outlet, and a mounting cavity is defined in the outer housing. The at least one first connecting component is connected to the outer housing and is configured to detachably connect with at least one liquid storage device. The outer housing is connected to the at least one liquid storage device through the at least one first connecting component, so that the liquid inlet is communicated with a liquid storage cavity of the at least one liquid storage device. The liquid spraying structure includes at least one liquid spraying hole, and the at least one liquid spraying hole is communicated with the liquid outlet. The liquid driving structure is disposed in the mounting cavity and is configured to communicate the liquid inlet and the liquid outlet. Liquid in the liquid storage cavity is driven by the liquid driven structure to flow from the liquid inlet to the liquid outlet and is sprayed out through the at least one liquid spraying hole.

In one embodiment, first connecting components having different structures and liquid storage devices having different structures are provided, the first connecting components are detachably connected to the outer housing, one of the first connecting components is matched with a corresponding one of the liquid storage devices, and the one of the first connecting components matched with the corresponding one of the liquid storage devices is connected to the outer housing. The outer housing is connected to the first connecting components having different structures to connect to the liquid storage devices having different structures.

In one embodiment, each of the first connecting components includes a first connecting portion and a second connecting portion, each the first connecting portion is screwed with the outer housing, each the second connecting portion is screwed with the corresponding one of the liquid storage devices, and each the second connecting portion has a different structure.

In one embodiment, the liquid spraying structure is detachably connected to the outer housing.

In one embodiment, the liquid spraying structure includes a liquid spraying component and a second connecting component. A liquid guiding channel is formed in the liquid spraying component, liquid spraying holes are provided and are defined at a first end of the liquid spraying component at intervals, and the liquid spraying holes are communicated with the liquid guiding channel. The second connecting component is connected to a second end of the liquid spraying component, the second connecting component is configured to connect to the outer housing, to communicate the liquid guiding channel with the liquid outlet.

In one embodiment, the second connecting component is detachably connected to the outer housing, and an external thread is disposed on an outer periphery of the second connecting component.

In one embodiment, the liquid spraying structure further includes a waterproof component, a transition channel is formed in the waterproof component, a first fixing groove is defined at one end of the second connecting component distal from the liquid spraying component, the waterproof component is disposed in the first fixing groove, and the transition channel is configured to communicate the liquid guiding channel with the liquid outlet.

In one embodiment, a second fixing groove is defined on the outer housing, and the second fixing groove is configured to connect to the second connecting component.

In one embodiment, the cleaning device further includes a dustproof cover, the dustproof cover is detachably connected in the second fixing groove.

In one embodiment, the cleaning device further includes an accommodating box, the accommodating box is detachably connected to the outer housing, the accommodating box includes an accommodating cavity having an opening facing upwards, and the accommodating box is configured to accommodate the liquid spraying structure.

In one embodiment, two protruding abutting portions are respectively disposed on two side walls of the accommodating cavity in a thickness direction of the accommodating cavity. When the liquid spraying structure is located in the accommodating cavity, two ends of the liquid spraying structure respectively abut against the two protruding abutting portions.

In one embodiment, ventilation channels are defined in the outer housing, when the at least one first connecting component is connected to the at least one liquid storage device, the ventilation channels are configured to communicate the liquid storage cavity with external air pressure.

In one embodiment, the ventilation channels are ventilation pipes, a first end of each of the ventilation pipes is communicated with the liquid storage cavity, and a second end of each of the ventilation pipes is communicated with the external air pressure.

In one embodiment, the liquid driving structure includes a housing assembly, an impeller, and a motor. The motor is disposed on the housing assembly, a liquid channel is defined on the housing assembly, a first end of the liquid channel is communicated with the liquid inlet, and a second end of the liquid channel is communicated with the liquid outlet, the impeller is disposed in the liquid channel and is in transmission connection with the motor. When the motor drives the impeller to rotate, the liquid in the liquid storage cavity sequentially passes through the liquid inlet, the liquid channel, and the liquid outlet, and is sprayed out through the at least one liquid spraying hole.

In one embodiment, the cleaning device further includes a temperature sensor and an indicator light, the temperature sensor is electrically connected to the indicator light. The temperature sensor is disposed in the outer housing, and is configured to sense a temperature of the liquid in the liquid storage cavity. The indicator light is disposed on an outer wall surface of the outer housing, and is configured to indicate a temperature of the liquid in the liquid storage cavity.

In one embodiment, the cleaning device further includes a flexible pipe and a gravity ball, the flexible pipe is communicated with the liquid inlet, the gravity ball is disposed at one end of the flexible pipe distal from the liquid inlet.

In one embodiment, the cleaning device further includes a control circuit board, a control button, and a battery. The control circuit board and the battery are disposed in the mounting cavity, the liquid driving structure is controlled by the control circuit board, the battery is configured to supply power to the control circuit board and the liquid driving structure, the control button is disposed on an outer wall surface of the outer housing and is electrically connected to the control circuit board.

In one embodiment, the outer housing includes an upper housing body and a lower housing body, the upper housing body and the lower housing body are matched to enclose the mounting cavity, the liquid inlet is defined on the lower housing body, and the liquid outlet is defined on the upper housing body.

In one embodiment, a third fixing groove is recessed inwards from a bottom of the lower housing body, a mounting portion protrudes from a middle of the third fixing groove to form a mounting groove, the liquid driving structure is disposed in the mounting groove, and the at least one first connecting component is connected to an inner wall surface of the third fixing groove.

Based on the cleaning device of the embodiments of the present disclosure, the at least one connecting component is connected to the at least one liquid storage device, the liquid in the at least one liquid storage device is driven by the liquid driven structure to spray out through the at least one liquid spraying hole, so as to clean the private parts of the human bodies. Moreover, the outer housing is detachably connected with the at least one connecting component, so that the cleaning device of the embodiments of the present disclosure is relatively small in size, which is inconvenient to transport, and carry when going outside or being on business trips, use convenience is further improved.

In a second aspect, the embodiments of the present disclosure provide a cleaner, including the cleaning device and the at least one liquid storage device as foregoing.

BRIEF DESCRIPTION OF DRAWINGS

In order to more clearly illustrate embodiments of the present disclosure or technical solutions in the prior art, drawings that need to be used in the embodiments or the prior art are briefly described below, and it is obvious that the drawings in following description are merely some embodiments of the present disclosure, and for those who skilled in the art, other drawings may be obtained according to structures shown in the accompanying drawings.

Figure 1:
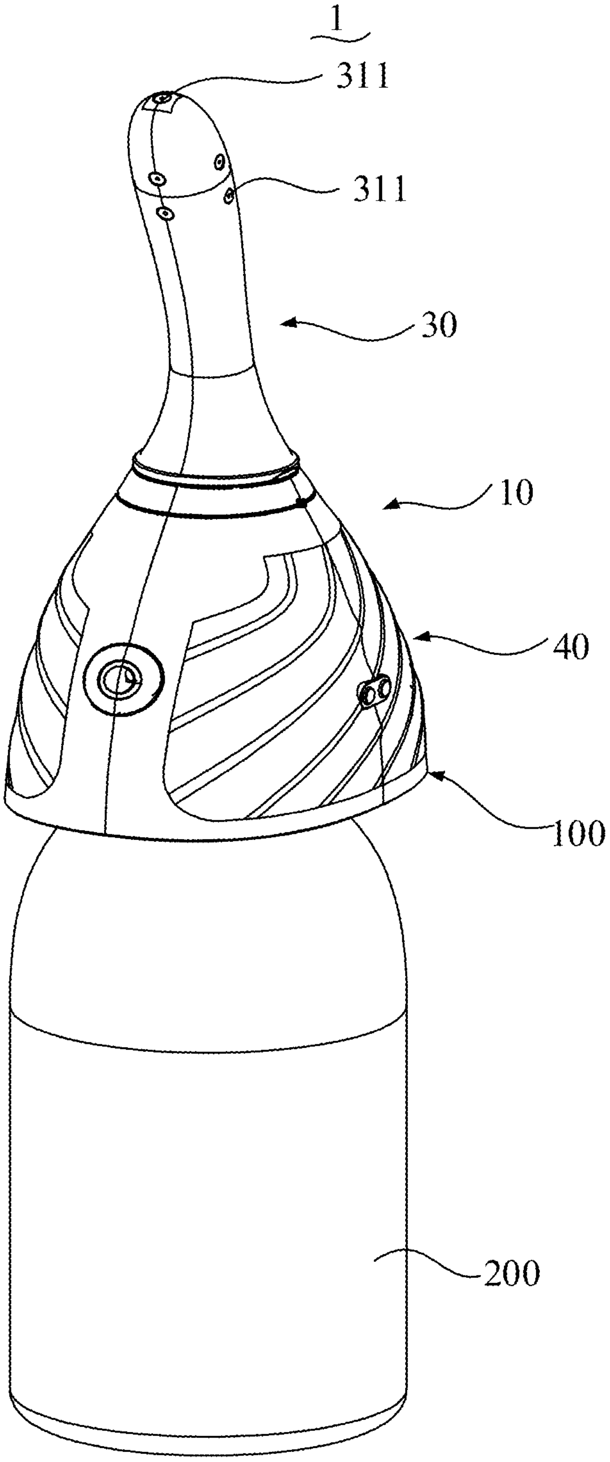
FIG. 1 is a structural schematic diagram of a cleaning device, where the cleaning device is in a use state.

Reference numerals in the drawings: 1. cleaner; 100. cleaning device; 10. outer housing; 11. upper housing body; 111. second fixing groove; 12. lower housing body; 122. mounting portion; 13. mounting cavity; 131. mounting groove; 6. dustproof cover; 17. ring-shaped fixing block; 20. first connecting component; 21. first connecting portion; 22. second connecting portion; 30. liquid spraying structure; 31. liquid spraying component; 311. liquid spraying hole; 312. liquid guiding channel; 32. second connecting component; 321. first fixing groove; 33. waterproof component; 40. liquid driving structure; 50. accommodating box; 51. accommodating cavity; 52. protruding abutting portion; 60. ventilation channel; 71. temperature sensor; 72. indicator light; 81. flexible pipe; 82. gravity ball; 91. control circuit board; 92. control button; 93. battery; 200. liquid storage device.

According to the present disclosure, implementation, functional characteristics, advantages are further explained with reference to the accompanying drawings.

DETAILED DESCRIPTION OF EMBODIMENTS

In order to make purposes, technical solutions, and advantages of the present disclosure clearer, embodiments of the present disclosure are further described in detail with reference to accompanying drawings below.

Following description refers to the accompanying drawings in which the same numerals in different drawings represent the same or similar elements unless otherwise represented. The implementations described in the following exemplary embodiments do not represent all implementations consistent with the present disclosure. Rather, they are merely examples of devices and methods consistent with some portions of the present disclosure as detailed in appended claims.

In the description of the present disclosure, it should be understood that terms "first", "second", etc. are only used for descriptive purposes, and cannot be understood as indicating or implying relative importance. For those who skilled in the art, specific meaning of the above terms in the present disclosure may be specifically understood. In addition, in the description of the present disclosure, unless otherwise specified, "a plurality of" means two or more. For example, A and/or B may indicate that there may be three relationships, for example, A and/or B may indicate that A exists alone, A and B exist at the same time, and B exists alone. The character "/" generally indicates that the associated object is an "or" relationship.

Unless otherwise defined, all technical and scientific terms used herein have the same meaning as commonly understood by those who skilled in the art to which the present disclosure belongs. The terminology used herein is for the purpose of describing particular embodiments only and is not intended to limit the present disclosure. As used herein, the term "and/or" includes any and all combinations of one or more of the associated listed items.

Figure 2:
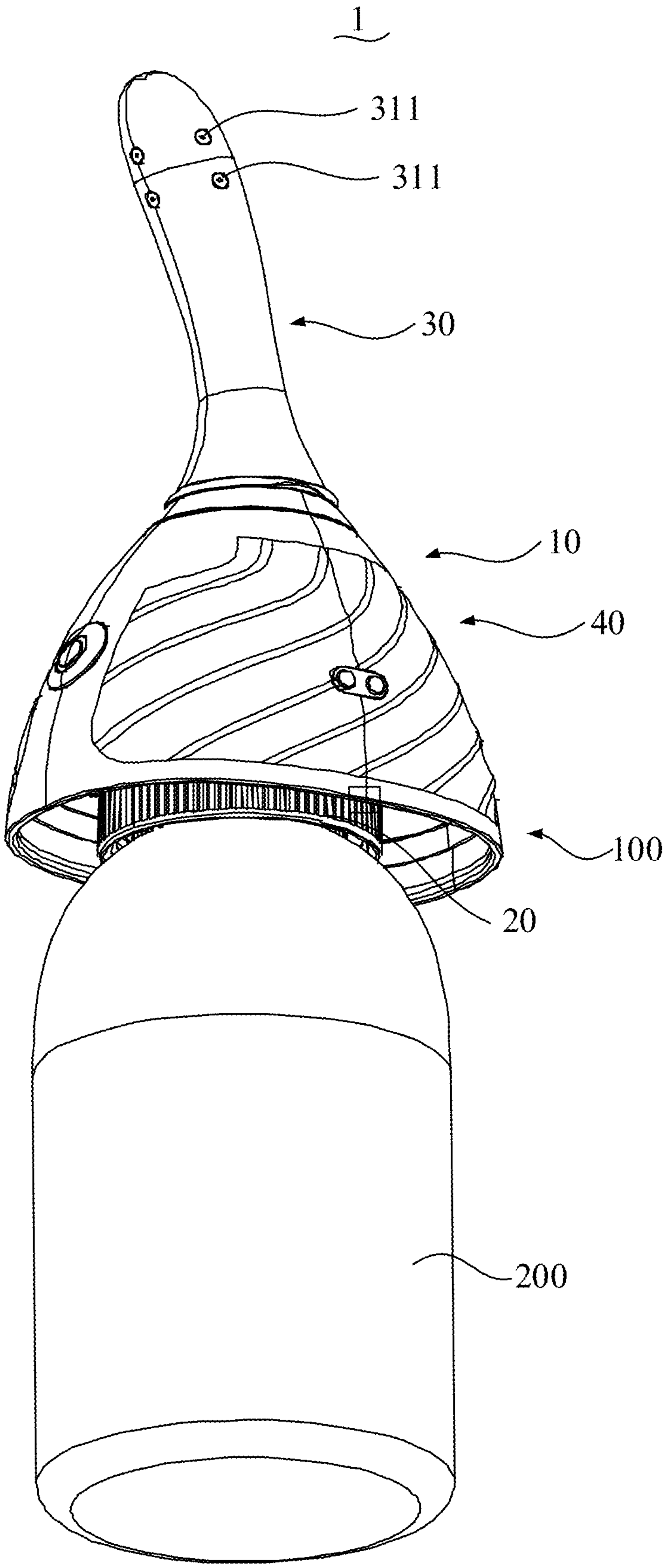
FIG. 2 is a structural schematic diagram of the cleaning device, where one of at least one connecting component is assembled with a corresponding one of at least one liquid storage device.
Figure 3:
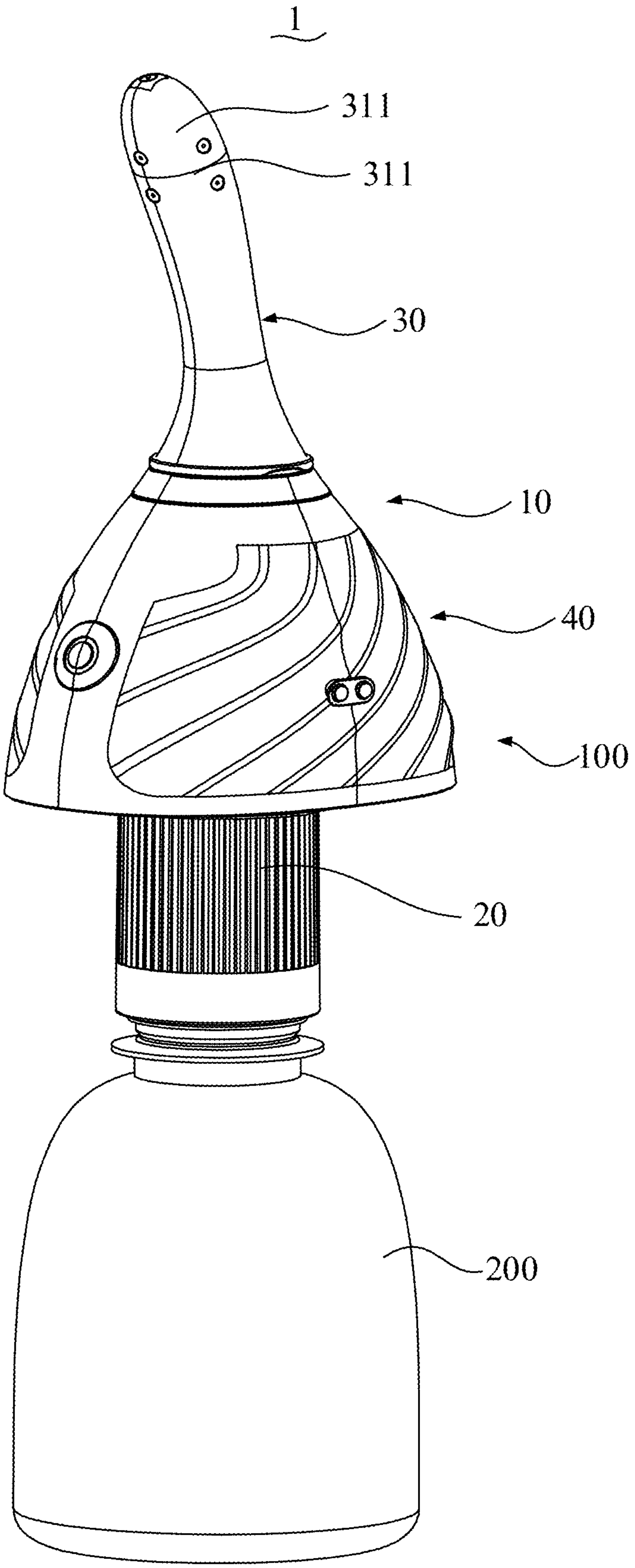
FIG. 3 is a structural schematic diagram of the cleaning device, where another one of at least one connecting component is assembled with another corresponding one of at least one liquid storage device.

Please refer to FIGS. 1-3, the present disclosure provides a cleaning device 100 and a cleaner 1, the cleaner 1 includes the cleaning device 100 and at least one liquid storage device 200. The at least one liquid storage device 200 may be a water bottle, a kettle, a water cup, etc., and the present disclosure is not limited thereto. The cleaning device 100 is configured to clean private parts of human bodies, including an outer housing 10, at least one first connecting component 20, a liquid spraying structure 30, and a liquid driving structure 40.

Figure 4:
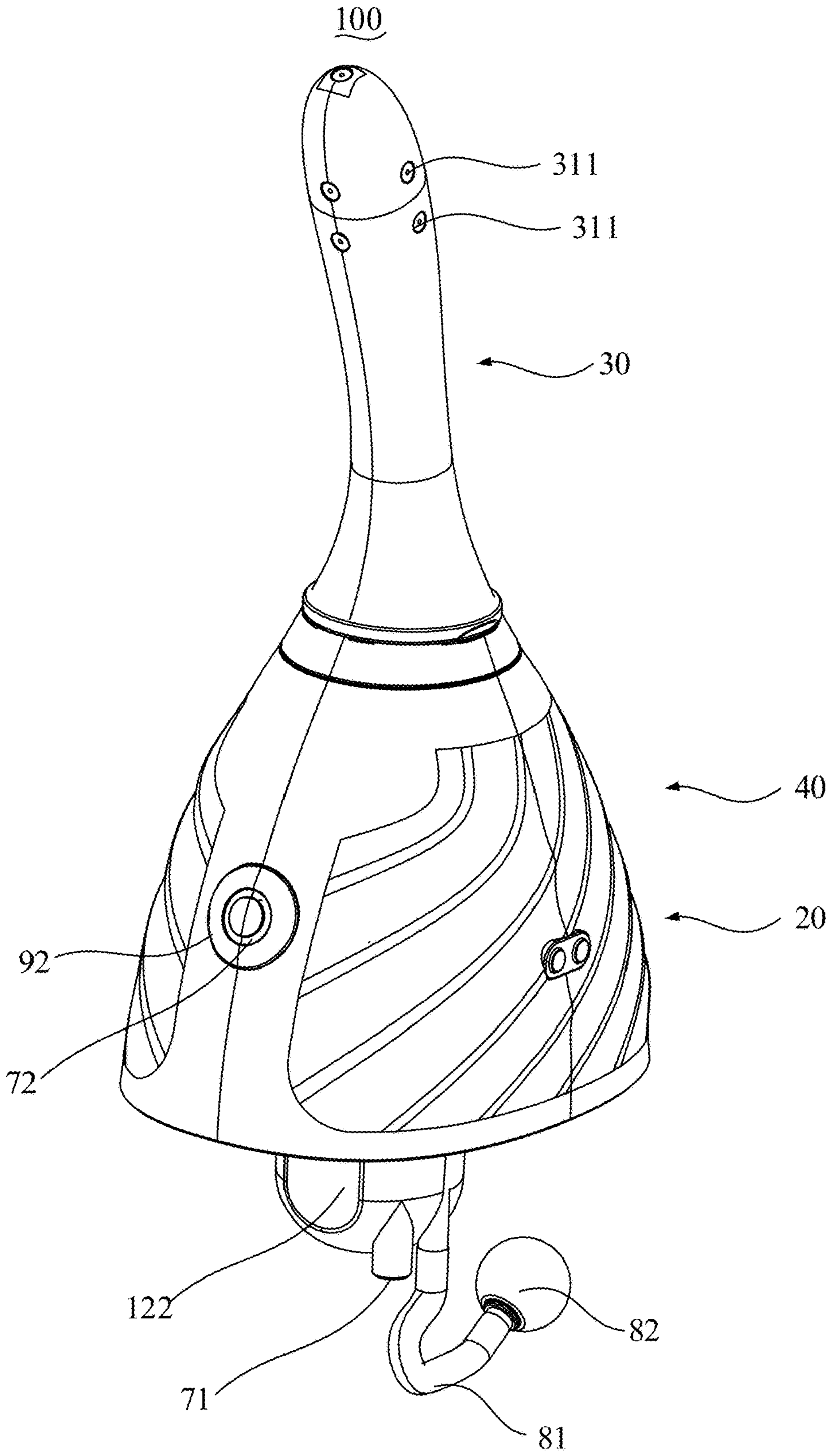
FIG. 4 is a structural schematic diagram of the cleaning device illustrated in a first view angle.
Figure 5:
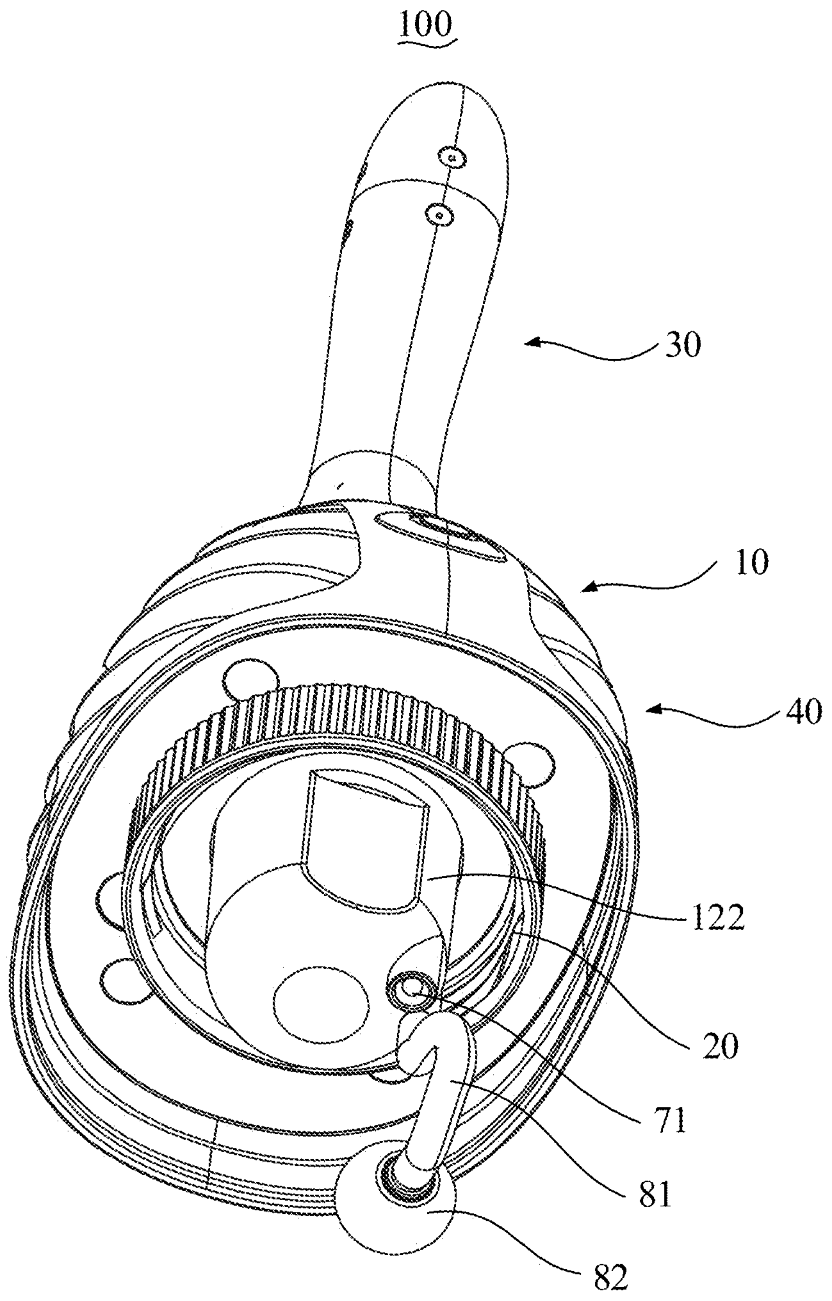
FIG. 5 is a structural schematic diagram of the cleaning device illustrated in a second view angle.
Figure 6:
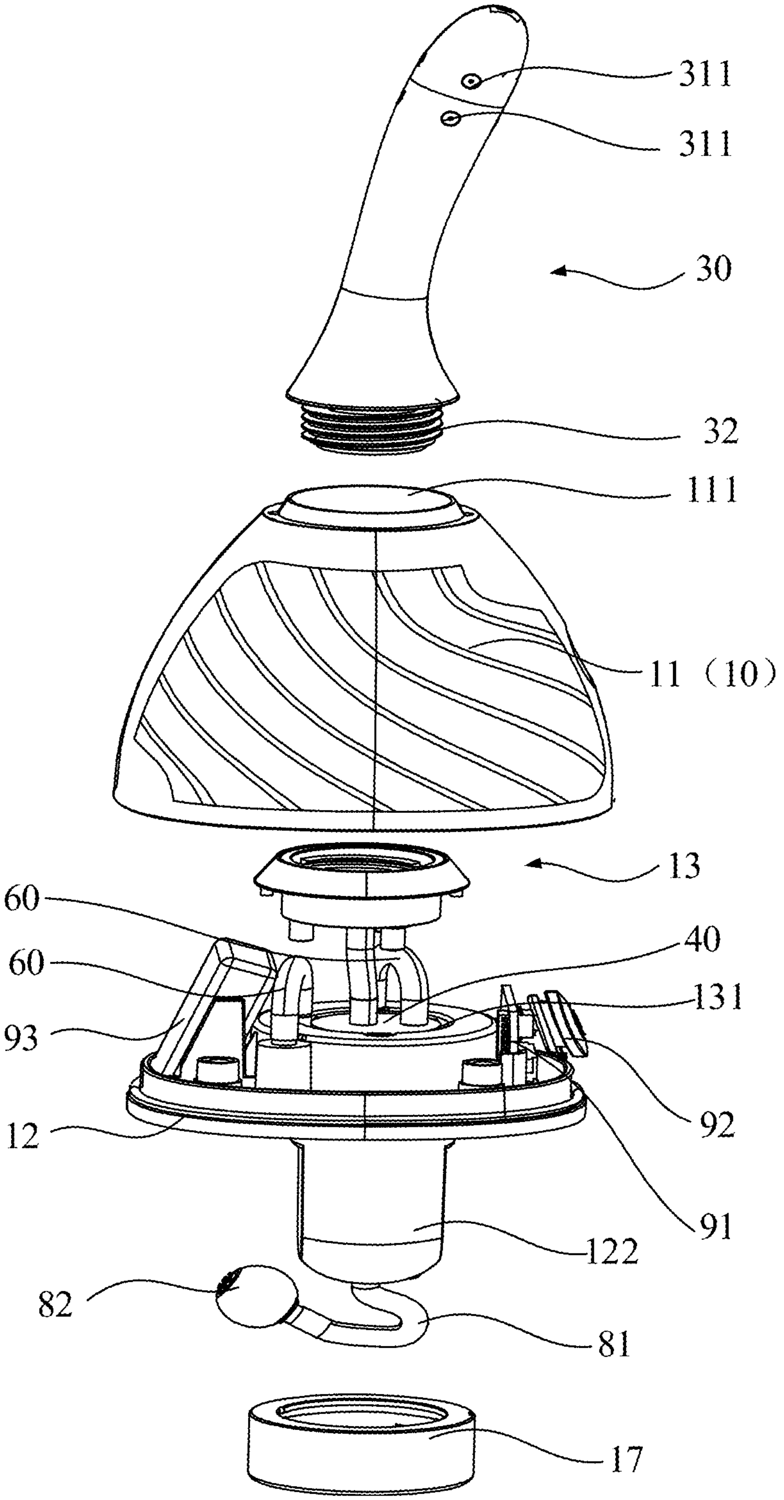
FIG. 6 is an exploded schematic diagram of the cleaning device, where the at least connecting component is removed.

Please further refer to FIGS. 4-6, the outer housing 10 includes an upper housing body 11 and a lower housing body 12, the upper housing body 11 and the lower housing body 12 are matched to enclose a mounting cavity 13, a liquid inlet is defined on the lower housing body 12, and a liquid outlet is defined on the upper housing body 11. The upper housing body 11 and the lower housing body 12 are detachably connected, according to a connection manner of the upper housing body 11 and the lower housing body 12, the upper housing body 11 and the lower housing body 12 are snap-fitted by a buckle and a hook, that is, one of the upper housing body 11 and the lower housing body 12 is provided with the buckle, another one of the upper housing body 11 and the lower housing body 12 is provided with the hook matching the buckle, and the upper housing body 11 and the lower housing body 12 are snap-fitted together by snap-fitting the buckle and the hook, which is simple to assemble. However, in some other connection manners, at least one first connecting hole is defined on the upper housing body 11, and at least one second connecting hole is defined on the lower housing body 12 corresponding to the at least one first connecting hole, and at least one fastener is sequentially inserted into the at least one second connecting hole and the at least one first connecting hole to connect the upper housing body 11 with the lower housing body 12. The at least one fastener is a threaded component, such as a screw, a bolt, etc., and the connection manner of the upper housing body 11 and the lower housing body 12 is not specifically limited.

The liquid spraying structure 30 comprises liquid spraying holes 311, the liquid spraying holes 311 are communicated with the liquid outlet. In some structural forms, the liquid spraying structure 30 is integrally formed with the upper housing body 11, such configuration provides good leakproofness between the liquid spraying holes 311 and the liquid outlet. It may be understood that in order to improve diversity of the liquid spraying structure 30 in use, in some embodiments, the liquid spraying structure 30 is detachably connected to the upper housing body 11. In this way, in addition to being connected to the upper housing body 11, the liquid spraying structure 30 is also capable of being connected to other devices, for example, a sprinkler water pipe, a water pipe, etc., which is convenient for the liquid spraying structure 30 to be used in different scenarios.

Figure 10:
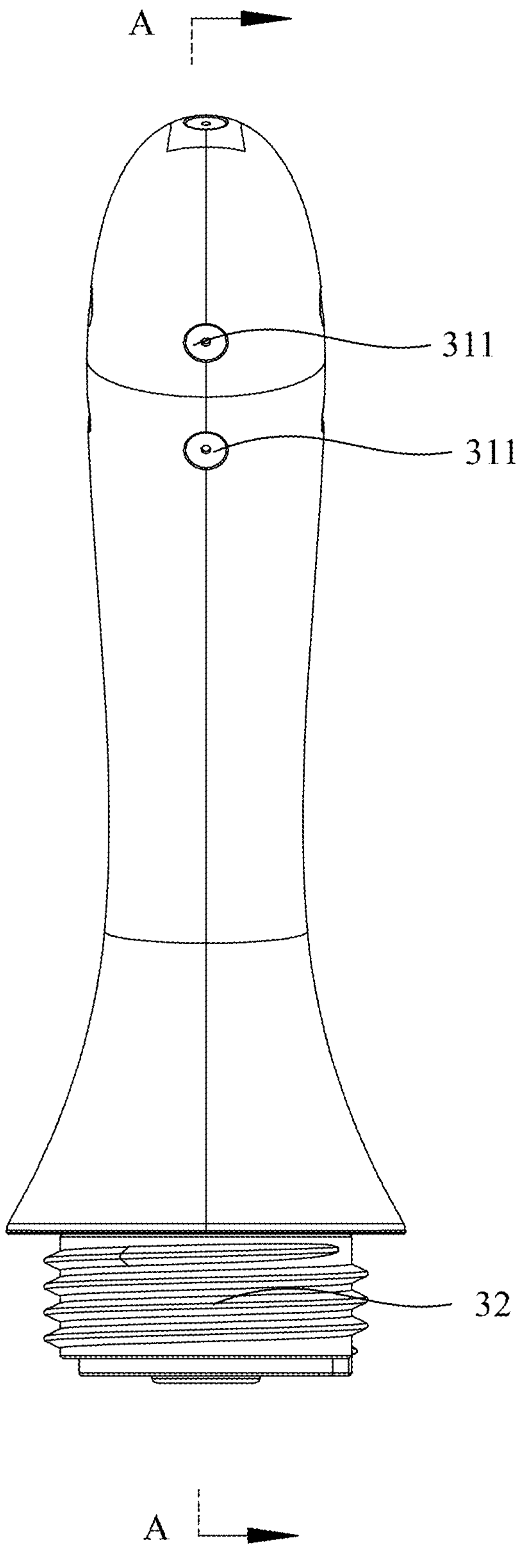
FIG. 10 is a structural schematic diagram of the liquid spraying structure.
Figure 11:
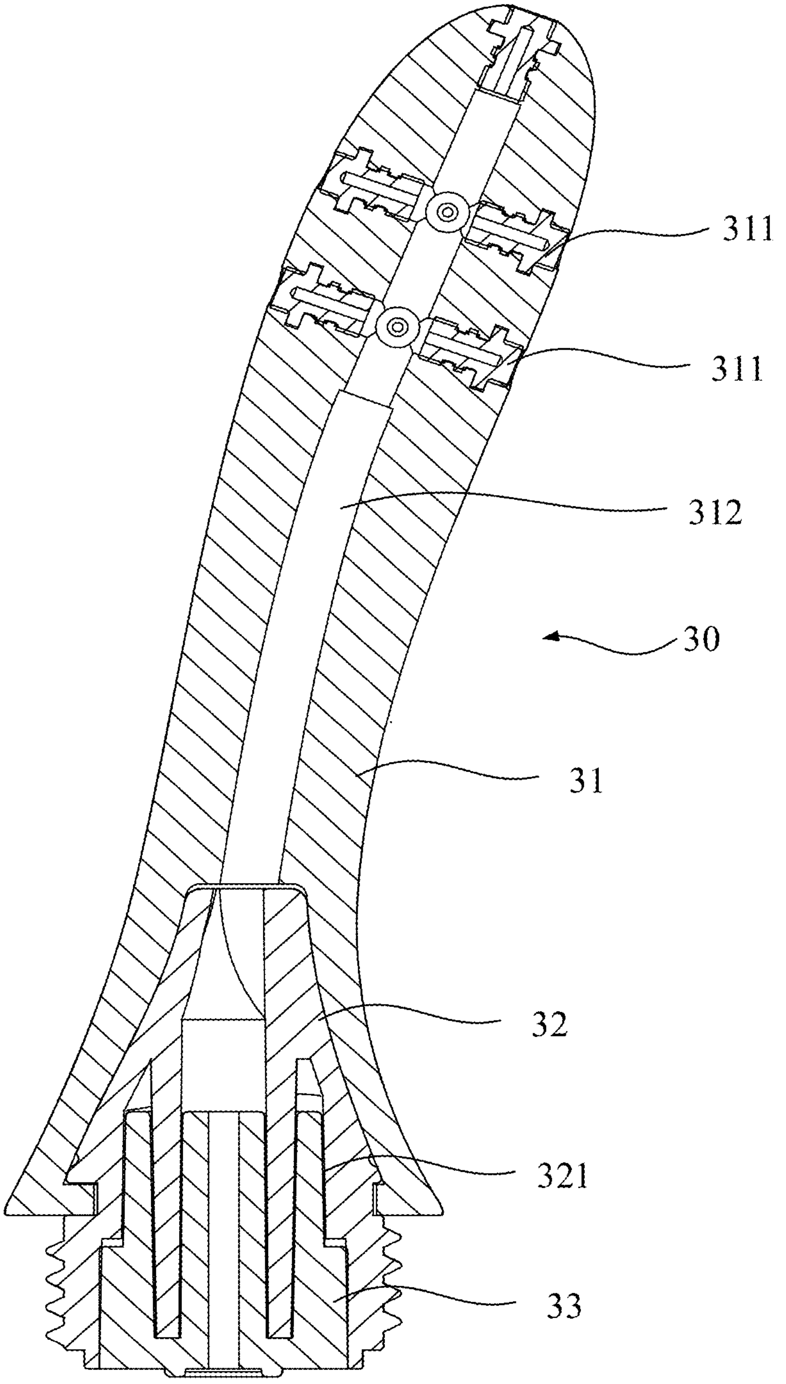
FIG. 11 is a cross-sectional schematic diagram taken along the line A-A shown in FIG. 9.
Figure 13:
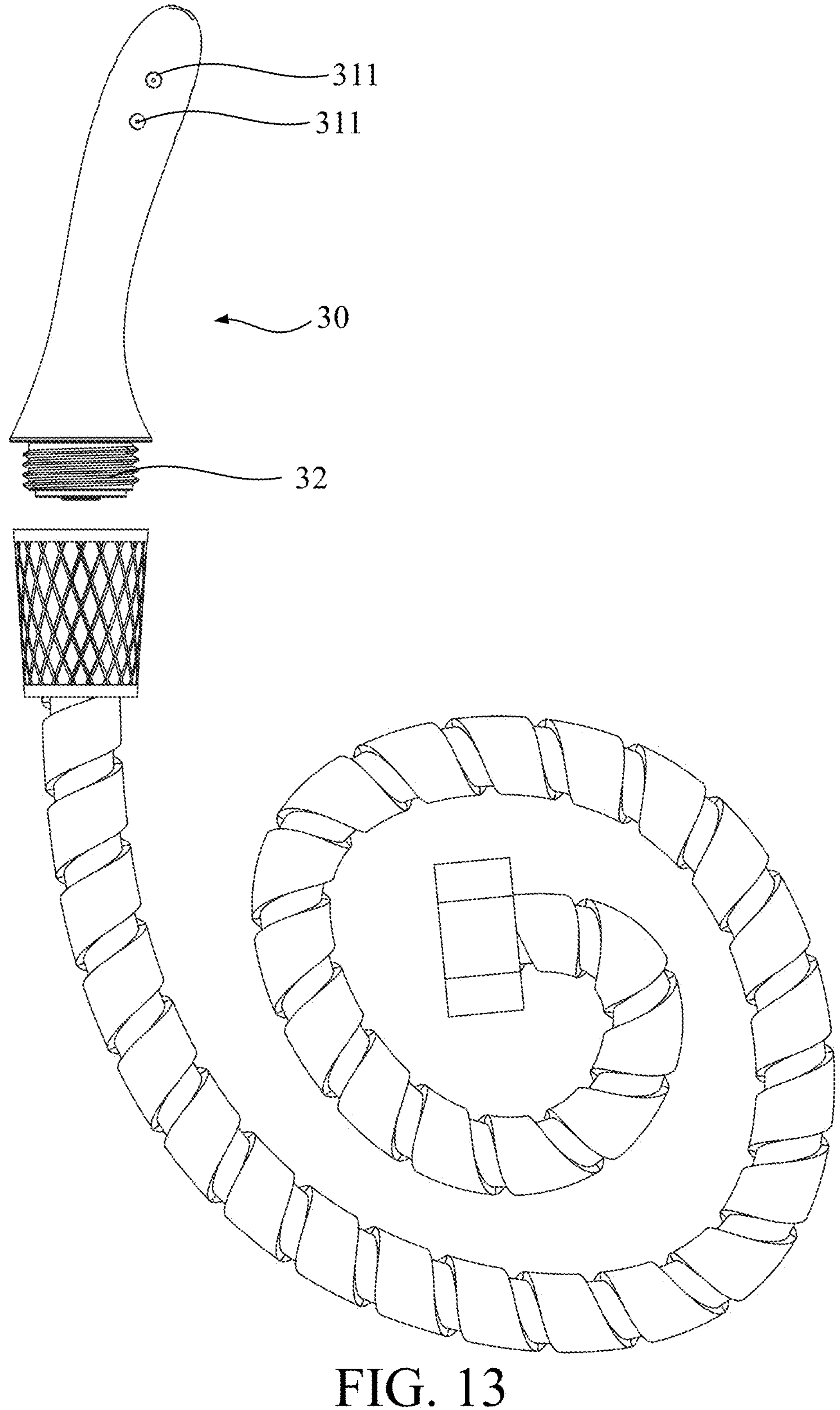
FIG. 13 is an assembly schematic diagram of the liquid spraying structure and a sprinkler.

In some structural forms, please refer to FIGS. 10-11, the liquid spraying structure 30 includes a liquid spraying component 31 and a second connecting component 32. A liquid guiding channel 312 is formed in the liquid spraying component 31, liquid spraying holes 311 are provided and are defined at a first end of the liquid spraying component 31 at intervals, and the liquid spraying holes 311 are communicated with the liquid guiding channel 312. The second connecting component 32 is connected to a second end of the liquid spraying component 31, the second connecting component 32 is configured to connect to the outer housing 10, to communicate the liquid guiding channel 312 with the liquid outlet. Please refer to FIG. 13, it should be understood that in order to connect to the liquid spraying structure 30 with the sprinkler water pipe, the second connecting component 32 is detachably connected to the outer housing 10, an outer thread is disposed on a periphery of the second connecting component 32, and the second connecting component 32 is screwed with the sprinkler water pipe through the outer thread, so that the liquid spraying structure 30 is connected with the sprinkler water pipe.

It should be noted that, the liquid spraying component 31 is made of flexible materials, such as polyethylene (PE), polypropylene (PP), polyvinyl chloride (PVC), rubber, silica gel, etc., so that the liquid spraying component 31 have certain softness, which is easy to fit in the private parts of the human bodies for cleaning, further, the liquid spraying component 31 is a cylindrical structure, which is convenient for reaching into the private parts of the human bodies for cleaning.

Figure 8:
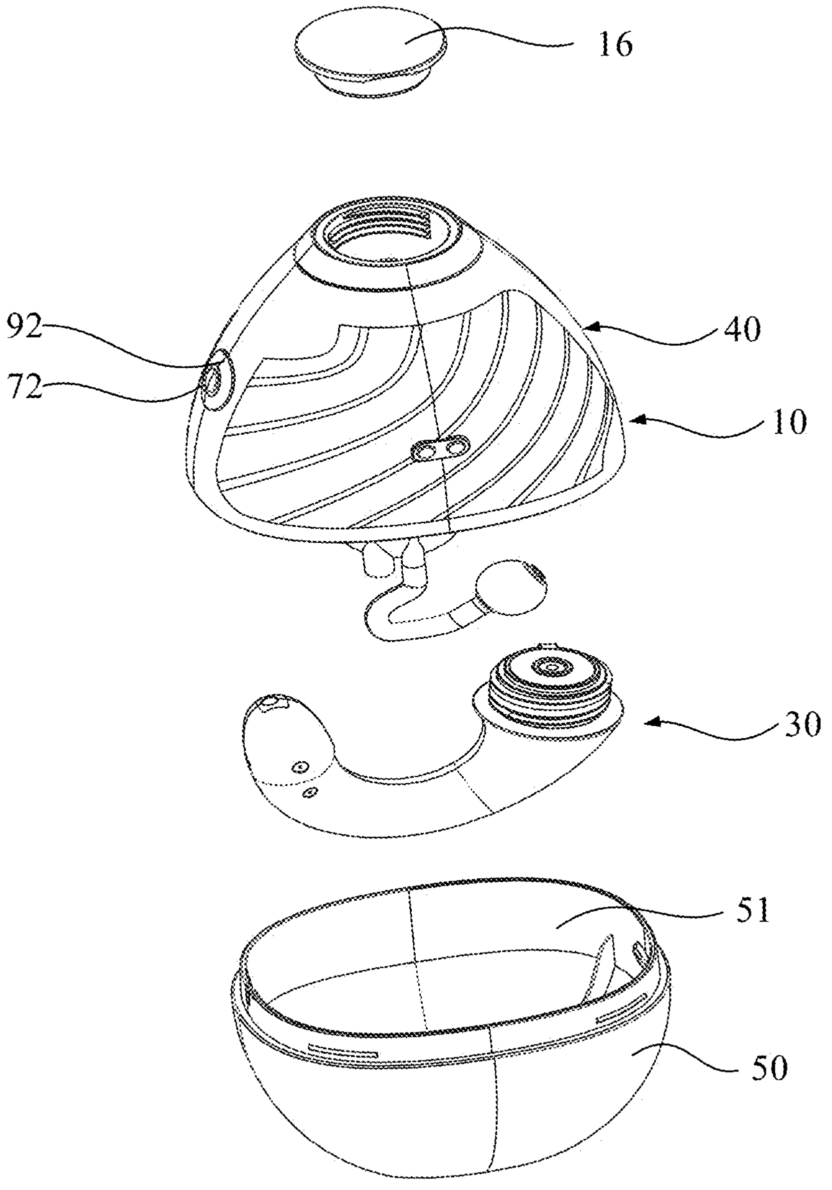
FIG. 8 is an exploded schematic diagram of the cleaning device, where the cleaning device is in an accommodating state.

In order to connect the upper housing body 11 to the liquid spraying structure 30, please refer to FIGS. 6 and 8, a second fixing groove 111 is defined on the outer housing body 11, an inner thread is disposed on an inner wall of the second fixing groove 111, and the outer thread of the second connecting component 32 is connected with the inner wall of the second fixing groove 111, so that the second connecting component 32 is fixed against the upper housing body 11. Certainly, in other connection manners, a buckle or a hook is disposed on the second connecting component 32, and a corresponding buckle hole or a corresponding hook slot is disposed on the upper housing body 11, thereby connecting the second connecting component 32 and the upper housing body 11 through snap-fitting. The present disclosure does not specifically limit the connection manner between the second connecting component 32 and the upper housing body 11 herein.

It should be understood that, when the liquid spraying structure 30 and the upper housing body 11 are detached, the second fixing groove 111 is exposed, at this time, dust may easily pollute the liquid outlet. For protecting the liquid outlet, please refer to FIGS. 6 and 8, the cleaning device 100 also includes a dustproof cover 16. When the second fixing groove 111 is exposed, the dustproof cover 16 is detachably connected in the second fixing groove 111. The dustproof cover 16 is made of a flexible material, which is disassembled and assembled in the second fixing groove 111 through deformation ability thereof, and the dustproof cover 16 is threaded or buckled with the second fixing groove 111 to realize that the dustproof cover 16 is detachably connected to the upper housing body 11. The dustproof cover 16 may effectively block external dust, dirt, particles, etc., which prevents the liquid outlet or an interior of the cleaning device 100 from entering the external dust, dirt, particles, etc., therefore cleanliness and operation safety of the cleaning device 100 is maintained. The above flexible material is made of polymer materials, such as the polypropylene (PP), the polyethylene (PE), the polyvinyl chloride (PVC), and may also be made of rubber materials, such as silicone rubber (Silicone), nitrile rubber (Nitrile), etc. The present disclosure does not limit the specific material of the dustproof cover 16 herein.

In order to improve communication of the liquid spraying structure 30 and the outer housing 10, please refer to FIGS. 10 and 11, the liquid spraying structure 30 further includes a waterproof component 33, a transition channel is formed in the waterproof component 33, a first fixing groove 321 is defined at one end of the second connecting component 32 distal from the liquid spraying component 31, the waterproof component 33 is disposed in the first fixing groove 321, and defines the transition channel. When the liquid spraying structure 30 and the upper housing body 11 are assembled and fixed, the waterproof component 33 seals a gap between the liquid spraying structure 30 and the upper housing body 11, and the transition channel communicates the liquid guiding channel 312 with the liquid outlet to realize a waterproof function. The waterproof component 33 is made of a flexible material, which may be silica gel, plastic cement, plastic, etc. The specific material of the waterproof component 33 is not limited herein.

Figure 7:
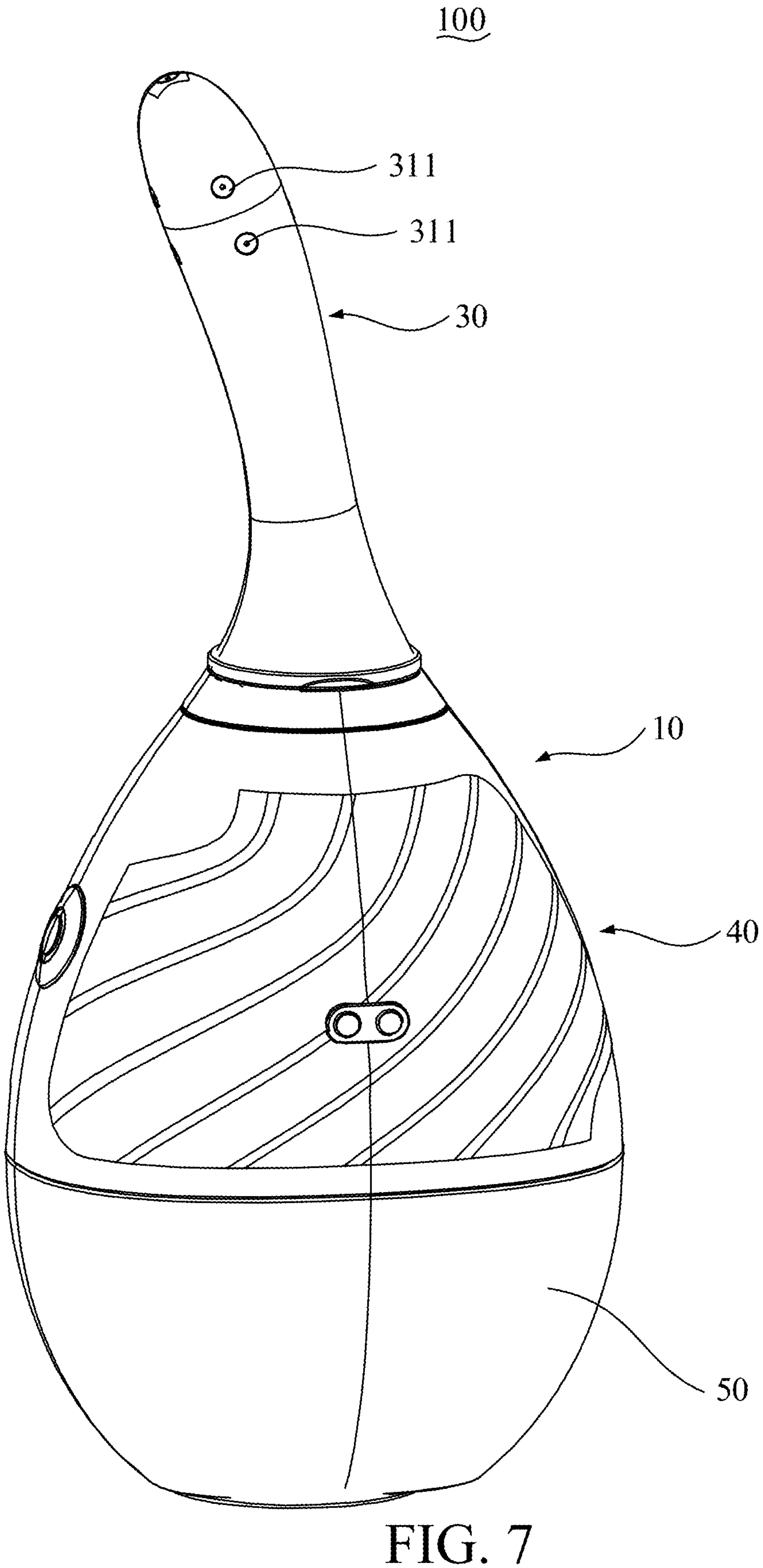
FIG. 7 is an assembly schematic diagram of the cleaning device, where the cleaning device cooperates with an accommodating box.
Figure 9:
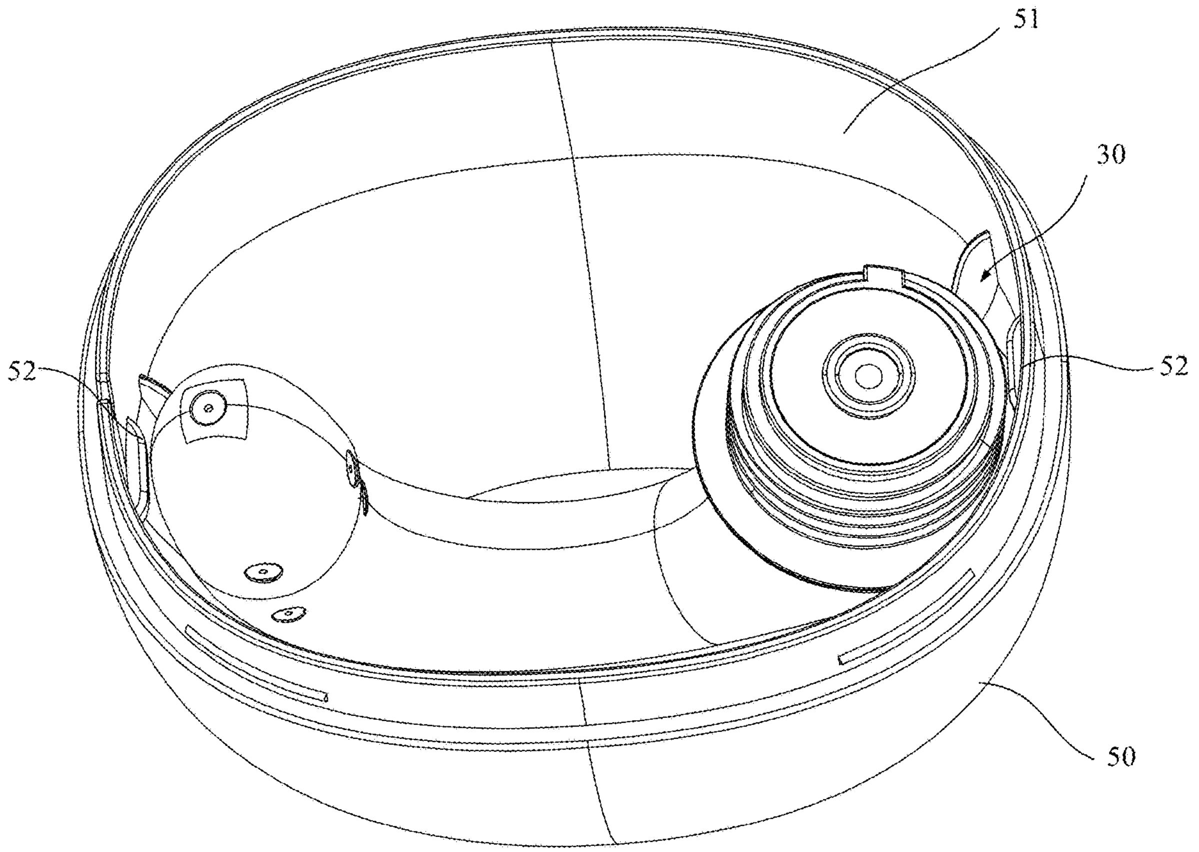
FIG. 9 is an assembly schematic diagram of a liquid spraying structure and the accommodating box, where the liquid spraying structure is accommodated in the accommodating box.

In order to accommodate the liquid spraying structure 30, please refer to FIGS. 7 and 8, the cleaning device 100 further includes an accommodating box 50, the accommodating box 50 is detachably connected to the lower housing body 12, preferably, the accommodating box 50 is buckled with the lower housing body 12, certainly, in other structural forms, the accommodating box 50 is threaded with the lower housing body 12. The accommodating box 50 includes an accommodating cavity 51 having an opening facing upwards, the liquid spraying structure 30 is stored in the accommodating cavity 51 when being detached. Please refer to FIG. 9, two protruding abutting portions 52 are respectively disposed on two side walls of the accommodating cavity 51 in a thickness direction of the accommodating cavity 51. Since the liquid spraying structure 30 has certain flexibility, when the liquid spraying structure 30 is located in the accommodating cavity 51, two ends of the liquid spraying structure 30 respectively abut against the two protruding abutting portions 52. The liquid spraying structure 30 of the present disclosure is installed on the upper housing body 11 when being in use, and is detached and stored in the accommodating box 50 when being free, and then the accommodating box 50 is buckled with the lower housing body 12, so that the cleaning device 100 is easily stored and carried.

First connecting components 20 having different structures and liquid storage devices 200 having different structures are provided, one of the first connecting components 20 matched with a corresponding one of the liquid storage devices 200 is connected to the lower housing body 12, the outer housing 10 is connected to the first connecting components 20 through the liquid storage devices 200, so that the liquid inlet is communicated with the liquid storage cavity of each of the liquid storage devices 200. Please refer to FIGS. 2 and 3, since the at least one connecting component 20 is detachably connected to the at least one liquid storage device 200, a size of the present disclosure is small for transportation and carrying, and a suitable liquid storage device 200 may be purchased to use in the cleaning device 100 of the present disclosure when the users go outside or are on business trip, high convenience is provided.

Specifically, the at least one first connecting component may be integrated with the lower housing body, that is, during the production and installation, the at least one first connecting component is machined in the lower housing body. In one optional embodiment, different lower housing bodies are provided and are machined with different first connecting components, so that different cleaning devices are connected to the different liquid storage devices, however, in this way, one cleaning device may only be connected to one specific liquid storage device, the users need to replace the cleaning device corresponding to the liquid storage device for connection use when using different liquid storage devices.

Figure 12:
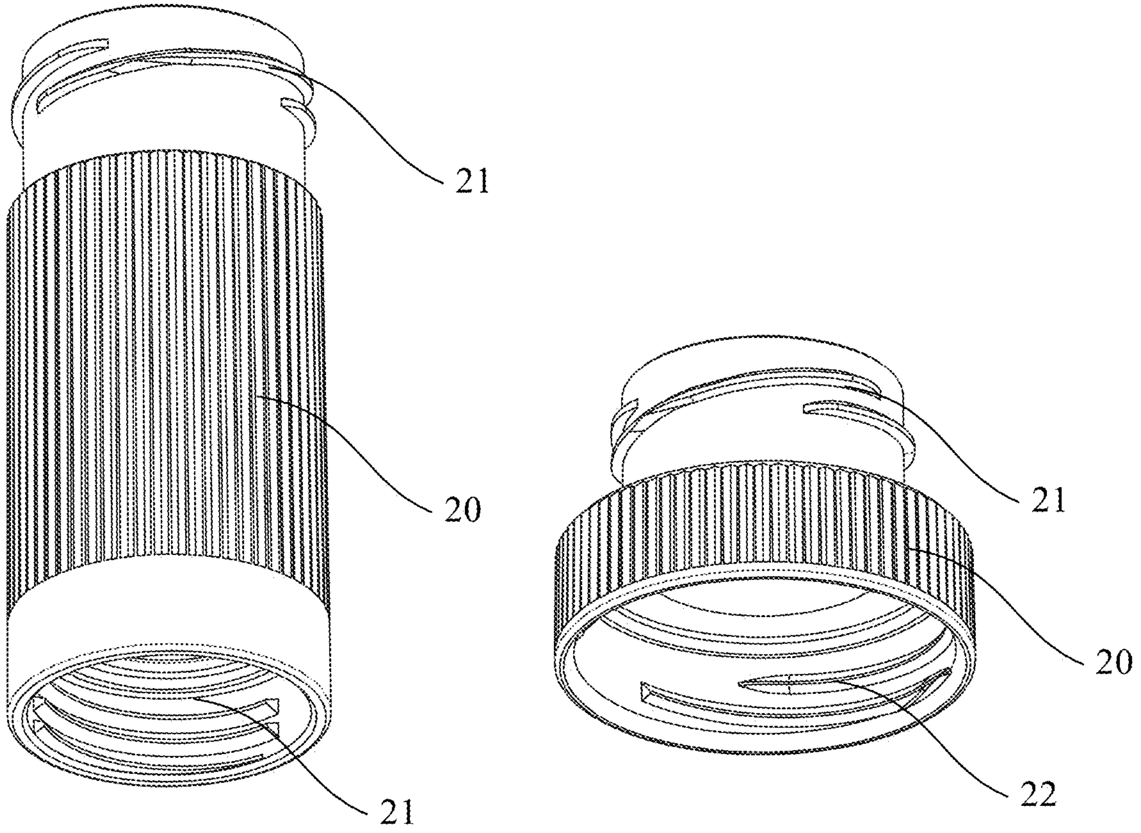
FIG. 12 is a structural schematic diagram of first connecting structures respectively having two structures.

In order to facilitate the cleaning device 100 to meet the connection requirements of the liquid storage devices 200 having different structures, as an improvement, the connecting components 20 are detachably connected to the lower housing body 12, please refer to FIG. 12, specifically, each of the first connecting components 20 includes a first connecting portion 21 and a second connecting portion 22, each the first connecting portion 21 is screwed with the lower housing 12, each the second connecting portion 22 is screwed with the corresponding one of the liquid storage devices 200, and each the second connecting portion 22 has a different structure. It should be understood that each first connecting portion 21 is screwed with the lower housing body 12, and each second connecting portion 22 is screwed with the correspondingly one of the liquid storage devices 200, so that the cleaning device 100 is connected to the liquid storage devices 200 having different structures through the first connecting components 20, use adaptability of the cleaner 1 is improved.

The liquid driving structure 40 is disposed in the mounting cavity 13 and is configured to communicate the liquid inlet and the liquid outlet. In some embodiments, the liquid driving structure 40 includes a housing assembly (not shown in the drawings), an impeller (not shown in the drawings), and a motor (not shown in the drawings). The motor is disposed on the housing assembly, a liquid channel is defined on the housing assembly, a first end of the liquid channel is communicated with the liquid inlet, and a second end of the liquid channel is communicated with the liquid outlet, the impeller is disposed in the liquid channel and is in transmission connection with the motor. When the motor drives the impeller to rotate, liquid sequentially passes through the liquid inlet, the liquid guiding channel 312, and the liquid outlet, and is sprayed out through the at least one liquid spraying hole 311. In other embodiments, two motors may be used to drive one impeller to increase water absorption efficiency of the liquid driving structure 40, and one motor to drive two impellers may also be adopted, i.e., two drive axes extend on both sides of the one motor, and the two impellers are connected with the two drive axes to improve the water absorption efficiency of the liquid driving structure 40. The specific form of the liquid driving structure 40 is not limited herein.

It should be noted that, the motor and the impeller is in a direct or indirect connection. For example, there is one motor and one impeller, one of a drive axis of the motor and the impeller defines a thread hole, another has a threaded portion, the thread hole is screwed with the threaded portion for fixing the drive axis and the impeller, In another embodiment, a first magnetic component is fixed on the drive axis of the motor, a second magnetic component is fixed on the impeller, and the drive axis of the motor and the impeller are fixed through magnetic attraction of the first magnetic component and the second magnetic component, and the impeller is driven by the magnetic attraction of the first magnetic component and the second magnetic component to rotate along with rotation of the drive axis of the motor. Connection methods of the motor and the impeller are not limited herein.

In order to facilitate to mount the liquid driving structure 40 in the mounting cavity 13 and connect the at least one first connecting component 20, a third fixing groove is recessed inwards from a bottom of the lower housing body 12. An inner thread is disposed on an inner wall surface of the third fixing groove, and the at least one first connecting component 20 is connected to the inner wall surface of the third fixing groove. In some structural forms, an annular fixing block 17 is further provided, an inner thread is disposed on an inner wall surface of the annular fixing block 17, and then the annular fixing block 17 is fixed on the inner wall surface of the third fixing groove, so that the lower housing body 12 is more conveniently processed, and the lower housing body 12 is more conveniently connected to the at least one first connecting component 20. Further, a mounting portion 122 protrudes from a middle of the third fixing groove to form a mounting groove 131 in the mounting cavity 13, the liquid driving structure 40 is disposed in the mounting groove 131, which is convenient for the lower housing body 12 to fixedly connected to the at least one connecting component 20, beneficial for mounting he liquid driving structure 40 in the mounting cavity 13, and further convenient for communicating the liquid inlet with the liquid driving structure 40.

In order to avoid forming negative pressure environment of the at least one liquid storage device 200 due to extracting liquid in the at least one liquid storage device 200 from the liquid driving structure 40, ventilation channels 60 are defined in the outer housing 10, when the at least one first connecting component 20 is connected to the at least one liquid storage device 200, the ventilation channels 60 are configured to communicate the liquid storage cavity with external air pressure. Thus, the at least one liquid storage device 200 is avoid from being squeezed and deformed due to an air pressure problem. In some structural forms, the ventilation channels 60 are ventilation pipes, a first end of each of the ventilation pipes is communicated with the liquid storage cavity, and a second end of each of the ventilation pipes is communicated with the external air pressure, which is simple to assemble and easy to process, certainly, in other embodiments, the ventilation pipes are further processed on the outer housing 10, which is not limited herein.

In order to avoid affecting the user experience with excessively high or low water temperature when using the cleaner 1 for cleaning, the cleaning device 100 further includes a temperature sensor 71 and an indicator light 72, the temperature sensor 71 is electrically connected to the indicator light 72, the temperature sensor 71 is configured to sense a temperature of the liquid in the liquid storage cavity, the indicator light 72 is disposed on an outer wall surface of the outer housing 10, and is configured to indicate a temperature of the liquid in the liquid storage cavity through light colors or light emitting frequency. For example, when a temperature of the liquid in the liquid storage cavity is at an appropriate threshold, such as 25-35° C., the indicator light 72 emits a green light, and the indicator light 72 emits a red light when the temperature in the liquid storage cavity is too high or too low, such as 0-18° C. or 38-200° C. Through the light colors, the temperature of the liquid in the liquid storage cavity is known.

In some embodiments, the cleaning device 100 further includes a flexible pipe 81 and a gravity ball 82, the flexible pipe 81 is communicated with the liquid inlet, the gravity ball 82 is disposed at one end of the flexible pipe 81 distal from the liquid inlet. The flexible pipe 81 is communicated with the liquid inlet, so that a length of the liquid inlet penetrating into the liquid storage cavity is prolonged, and the liquid driving structure 40 may conveniently extract the liquid in the liquid storage cavity. Since the flexible pipe 81 is made of a flexible material, the flexible pipe 81 has certain deformation capability, a liquid extraction port of the flexible pipe 81 is driven by the gravity ball 82 to be in contact with the bottommost part of a bottle, so that a water source is better used.

In some embodiments, the cleaning device 100 further includes a control circuit board 91, a control button 92, and a battery 93. The control circuit board 91 and the battery 93 are disposed in the mounting cavity 13, the liquid driving structure 40 and the temperature sensor 71 are controlled by the control circuit board 91, the control button 92 is disposed on an outer wall surface of the outer housing 10. Specifically, the users press the control button 92 to transmit a signal to the control circuit board 91, and the control circuit board 91 sends a control instruction to the liquid driving structure 40 and switches a working state of the liquid driving structure 40. In some structural forms, the indicator light 72 is disposed on the control button 92, so that after the users press the control button 92, the cleaning device 100 enters a working mode, at this time, the temperature sensor 71 senses the temperature, the indicator light 72 indicates whether the temperature is within a suitable threshold, and the indicator light 72 is disposed on the control button 92 for observation to facilitate users to perform a next operation.

Same or similar reference numerals in the drawings of the embodiments correspond to the same or similar components. In the description of the present disclosure, it should be understood that orientation or positional relation ships indicated by the terms “upper”, “lower”, “left”, “right”, etc. are based on orientation or positional relationship shown in the drawings, rather than indicating or implying that the referred device or element must have a specific orientation to construct to must operate in a specific orientation.

The above are merely preferred embodiments of the present disclosure, and are not intended to limit the present disclosure, and any modification, equivalent replacement, improvement, etc. made within spirit and principle of the present disclosure should be included within a protection scope of the present disclosure.

What is claimed is:

1. A cleaning device, comprising:

an outer housing;

at least one first connecting component;

a liquid spraying structure; and a liquid driving structure;

wherein the outer housing comprises a liquid inlet and a liquid outlet, and a mounting cavity is defined in the outer housing; the at least one first connecting component is connected to the outer housing and is configured to detachably connect with at least one liquid storage device, the outer housing is connected to the at least one liquid storage device through the at least one first connecting component, so that the liquid inlet is communicated with a liquid storage cavity of the at least one liquid storage device; the liquid spraying structure comprises at least one liquid spraying hole, and the at least one liquid spraying hole is communicated with the liquid outlet; the liquid driving structure is disposed in the mounting cavity and is configured to communicate the liquid inlet and the liquid outlet; and, liquid in the liquid storage cavity is driven by the liquid driven structure to flow from the liquid inlet to the liquid outlet and is sprayed out through the at least one liquid spraying hole;

the liquid spraying structure comprises a liquid spraying component, a second connecting component, and a waterproof component a liquid guiding channel is formed in the liquid spraying component; a transition channel is formed in the waterproof component, a first fixing groove is defined at one end of the second connecting component distal from the liquid spraying component, the waterproof component is disposed in the first fixing groove, and the transition channel is configured to communicate the liquid guiding channel with the liquid outlet.

2. The cleaning device according to claim 1, wherein the at least one first connecting component comprises first connecting components having different structures; the at least one liquid storage device comprises liquid storage devices having different structures; the first connecting components are detachably connected to the outer housing, one of the first connecting components is matched with a corresponding one of the liquid storage devices, and the one of the first connecting components matched with the corresponding one of the liquid storage devices is connected to the outer housing; the outer housing is connected to the first connecting components having different structures to connect to the liquid storage devices having different structures.

3. The cleaning device according to claim 2, wherein each of the first connecting components comprises a first connecting portion and a second connecting portion, each the first connecting portion is screwed with the outer housing, each the second connecting portion is screwed with the corresponding one of the liquid storage devices, and each the second connecting portion has a different structure.

4. The cleaning device according to claim 1, wherein the liquid spraying structure is detachably connected to the outer housing.

5. The cleaning device according to claim 4, wherein the at least one liquid spraying hole comprises liquid spraying holes; the liquid spraying holes are defined at a first end of the liquid spraying component at intervals, and the liquid spraying holes are communicated with the liquid guiding channel; and the second connecting component is connected to a second end of the liquid spraying component, the second connecting component is configured to connect to the outer housing, to communicate the liquid guiding channel with the liquid outlet.

6. The cleaning device according to claim 5, wherein the second connecting component is detachably connected to the outer housing, and an external thread is disposed on an outer periphery of the second connecting component.

7. The cleaning device according to claim 6, wherein a second fixing groove is defined on the outer housing, and the second fixing groove is configured to connect to the second connecting component.

8. The cleaning device according to claim 7, wherein the cleaning device further comprises a dustproof cover, the dustproof cover is detachably connected in the second fixing groove.

9. The cleaning device according to claim 4, wherein the cleaning device further comprises an accommodating box, the accommodating box is detachably connected to the outer housing, the accommodating box comprises an accommodating cavity having an opening facing upwards, and the accommodating box is configured to accommodate the liquid spraying structure.

10. The cleaning device according to claim 9, wherein two protruding abutting portions are respectively disposed on two side walls of the accommodating cavity in a thickness direction of the accommodating cavity; when the liquid spraying structure is located in the accommodating cavity, two ends of the liquid spraying structure respectively abut against the two protruding abutting portions.

11. The cleaning device according to claim 1, wherein ventilation channels are defined in the outer housing, when the at least one first connecting component is connected to the at least one liquid storage device, the ventilation channels are configured to communicate the liquid storage cavity with external air pressure.

12. The cleaning device according to claim 11, wherein the ventilation channels are ventilation pipes, a first end of each of the ventilation pipes is communicated with the liquid storage cavity, and a second end of each of the ventilation pipes is communicated with the external air pressure.

13. The cleaning device according to claim 1, wherein the liquid driving structure comprises a housing assembly, an impeller, and a motor; the motor is disposed on the housing assembly, a liquid channel is defined on the housing assembly, a first end of the liquid channel is communicated with the liquid inlet, and a second end of the liquid channel is communicated with the liquid outlet, the impeller is disposed in the liquid channel and is in transmission connection with the motor; and when the motor drives the impeller to rotate, the liquid in the liquid storage cavity sequentially passes through the liquid inlet, the liquid channel, and the liquid outlet, and is sprayed out through the at least one liquid spraying hole.

14. The cleaning device according to claim 1, wherein the cleaning device further comprises a temperature sensor and an indicator light, the temperature sensor is electrically connected to the indicator light; and the temperature sensor is disposed in the outer housing, and is configured to sense a temperature of the liquid in the liquid storage cavity; the indicator light is disposed on an outer wall surface of the outer housing, and is configured to indicate a temperature of the liquid in the liquid storage cavity.

15. The cleaning device according to claim 1, wherein the cleaning device further comprises a flexible pipe and a gravity ball, the flexible pipe is communicated with the liquid inlet, the gravity ball is disposed at one end of the flexible pipe distal from the liquid inlet.

16. The cleaning device according to claim 1, wherein the cleaning device further comprises a control circuit board, a control button, and a battery; and the control circuit board and the battery are disposed in the mounting cavity, the liquid driving structure is controlled by the control circuit board, the battery is configured to supply power to the control circuit board and the liquid driving structure, the control button is disposed on an outer wall surface of the outer housing and is electrically connected to the control circuit board.

17. The cleaning device according to claim 1, wherein the outer housing comprises an upper housing body and a lower housing body, the upper housing body and the lower housing body are matched to enclose the mounting cavity, the liquid inlet is defined on the lower housing body, and the liquid outlet is defined on the upper housing body.

18. The cleaning device according to claim 17, wherein a third fixing groove is recessed inwards from a bottom of the lower housing body, a mounting portion protrudes from a middle of the third fixing groove to form a mounting groove, the liquid driving structure is disposed in the mounting groove, and the at least one first connecting component is connected to an inner wall surface of the third fixing groove.

19. A cleaner, comprising:

the cleaning device and the at least one liquid storage device according to claim 2.

20. A cleaning device, comprising:

an outer housing;

at least one first connecting component;

a liquid spraying structure; and a liquid driving structure;

wherein the outer housing comprises a liquid inlet and a liquid outlet, and a mounting cavity is defined in the outer housing; the at least one first connecting component is connected to the outer housing and is configured to detachably connect with at least one liquid storage device, the outer housing is connected to the at least one liquid storage device through the at least one first connecting component, so that the liquid inlet is communicated with a liquid storage cavity of the at least one liquid storage device; the liquid spraying structure comprises at least one liquid spraying hole, and the at least one liquid spraying hole is communicated with the liquid outlet; the liquid driving structure is disposed in the mounting cavity and is configured to communicate the liquid inlet and the liquid outlet; and, liquid in the liquid storage cavity is driven by the liquid driven structure to flow from the liquid inlet to the liquid outlet and is sprayed out through the at least one liquid spraying hole;

wherein the cleaning device further comprises an accommodating box, the accommodating box is detachably connected to the outer housing, the accommodating box comprises an accommodating cavity having an opening facing upwards, and the accommodating box is configured to accommodate the liquid spraying structure; two protruding abutting portions are respectively disposed on two side walls of the accommodating cavity in a thickness direction of the accommodating cavity; when the liquid spraying structure is located in the accommodating cavity, two ends of the liquid spraying structure respectively abut against the two protruding abutting portions.

* * * * *